United States Patent
Chang et al.

(10) Patent No.: US 11,511,970 B2
(45) Date of Patent: Nov. 29, 2022

(54) HIGH FRICTION AND WEAR RESISTANT ELEVATOR SHEAVE LINER

(71) Applicant: OTIS ELEVATOR COMPANY, Farmington, CT (US)

(72) Inventors: Xiaoyuan Chang, Ellington, CT (US); Hong Yang, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 223 days.

(21) Appl. No.: 16/945,832

(22) Filed: Aug. 1, 2020

(65) Prior Publication Data
US 2022/0033228 A1    Feb. 3, 2022

(51) Int. Cl.
| | |
|---|---|
| B66B 15/00 | (2006.01) |
| B66B 15/04 | (2006.01) |
| F16H 55/38 | (2006.01) |
| F16H 55/50 | (2006.01) |
| F16H 55/32 | (2006.01) |

(52) U.S. Cl.
CPC ............. B66B 15/04 (2013.01); F16H 55/38 (2013.01); F16H 55/50 (2013.01); *F16H 2055/325* (2013.01)

(58) Field of Classification Search
None
See application file for complete search history.

(56) References Cited

U.S. PATENT DOCUMENTS

| | | | | |
|---|---|---|---|---|
| 2015/0354735 A1* | 12/2015 | Stahn | ............... | F16L 19/028 285/94 |
| 2019/0023535 A1* | 1/2019 | Valjus | ............... | D07B 5/006 |
| 2020/0055706 A1* | 2/2020 | Chang | ............... | B66B 15/04 |

FOREIGN PATENT DOCUMENTS

KR    20170009946 A   *   1/2017   ............. B24D 11/04

* cited by examiner

*Primary Examiner* — Emmanuel M Marcelo
(74) *Attorney, Agent, or Firm* — Carlson, Gaskey & Olds, P.C.

(57) ABSTRACT

An illustrative example embodiment of an elevator sheave liner includes a liner body having an inner surface configured to be received against a sheave and an outer surface configured to engage an elevator tension member. The liner body comprises a polymer material and a plurality of wear resistance particles in the composite material. The wear resistance particles are nanoparticles or microparticles. At least some of the wear resistance particles establish a traction characteristic of the outer surface of the sheave liner.

20 Claims, 2 Drawing Sheets

HIGH FRICTION AND WEAR RESISTANT ELEVATOR SHEAVE LINER

BACKGROUND

Elevator systems carry passengers, cargo or both between different levels in a building, for example. Some elevator systems operate on a hydraulic machine arrangement to move the elevator car as desired. Other elevator systems are traction-based and rely upon traction between a traction sheave and an elevator roping arrangement to cause desired movement of the elevator car.

Typical traction-based elevator systems include a roping arrangement that has a plurality of tension members such as steel ropes, for example. The roping arrangement follows a path defined by sheaves placed strategically within the elevator system. At least one of the sheaves operates as a traction sheave causing the roping arrangement to move responsive to operation of a machine that causes the traction sheave to rotate. Other sheaves are considered idler sheaves that move responsive to movement of the roping arrangement. Controlling the direction and speed of movement of the traction sheave provides the ability to move the elevator car in a desired direction at a desired speed.

It is necessary to have sufficient traction between the traction sheave and the tension members to achieve desired elevator car movement and to control car position, for example. In high rise buildings, the elevator system typically requires higher levels of traction. One approach to having a sufficient traction surface on a traction sheave involves controlling the surface roughness. A roughened surface provides more traction than a smoother surface, for example.

One drawback to that approach is that the sheave is subject to wear and increased traction can increase the rate of sheave wear. Sheave liners have been used so the liner can be replaced instead of the sheave. While sheave liners can provide cost savings by avoiding the need to replace or recondition the entire sheave, the liners may not provide the desired level of traction, especially at the level desired in a high rise elevator system.

SUMMARY

An illustrative example embodiment of an elevator sheave liner includes a liner body having an inner surface configured to be received against a sheave and an outer surface configured to engage an elevator tension member. The liner body comprises a composite material and a plurality of wear resistance particles in the composite material. The wear resistance particles are nanoparticles or microparticles. At least some of the wear resistance particles establish a traction characteristic of the outer surface of the sheave liner.

In an example embodiment including at least one of the features of the elevator sheave liner of the previous paragraph, at least some of the wear resistance particles are microparticles and the size of the microparticles is between about 1 µm and about 20 µm.

In an example embodiment including at least one of the features of the elevator sheave liner of any of the previous paragraphs, at least some of the wear resistance particles are nanoparticles and the size of the nanoparticles is between about 10 nm and about 1000 nm.

In an example embodiment including at least one of the features of the elevator sheave liner of any of the previous paragraphs, the wear resistance particles are uniformly dispersed throughout the composite material of the liner body.

In an example embodiment including at least one of the features of the elevator sheave liner of any of the previous paragraphs, the liner body comprises between 0.1% and 20% by weight wear resistance particles.

In an example embodiment including at least one of the features of the elevator sheave liner of any of the previous paragraphs, the wear resistance particles have a hardness of at least 5 on the Moh's hardness scale.

In an example embodiment including at least one of the features of the elevator sheave liner of any of the previous paragraphs, the wear resistance particles comprise silicon carbide (SiC), Silicon Nitride ($Si_3N_4$) or diamond.

In an example embodiment including at least one of the features of the elevator sheave liner of any of the previous paragraphs, the at least some of the wear resistance particles that establish the traction characteristic are exposed on the outer surface.

In an example embodiment including at least one of the features of the elevator sheave liner of any of the previous paragraphs, the composite comprises thermoplastic polyurethane.

An illustrative example embodiment of an elevator sheave includes a sheave body and the elevator sheave liner of any of the previous paragraphs.

An illustrative example embodiment of a method of making an elevator sheave liner includes preparing a composite material; mixing a plurality of wear resistance particles into the composite material, wherein the wear resistance particles are nanoparticles or microparticles; and forming a sheave liner body of the mixed composite material and wear resistance particles.

In an example embodiment including at least one of the features of the method of any of the previous paragraphs, the wear resistance particles have a hardness at least 5 on the Moh's hardness scale.

In an example embodiment including at least one of the features of the method of any of the previous paragraphs, the particles comprise silicon carbide (SiC), Silicon Nitride ($Si_3N_4$) or diamond.

In an example embodiment including at least one of the features of the method of any of the previous paragraphs, at least some of the wear resistance particles are microparticles having a size in a range from about 1 µm to about 20 µm.

In an example embodiment including at least one of the features of the method of any of the previous paragraphs, at least some of the wear resistance particles are nanoparticles having a size in a range from about 1 nm to about 1000 nm.

In an example embodiment including at least one of the features of the method of any of the previous paragraphs, mixing the wear resistance particles into the composite material includes uniformly dispersing the wear resistance particles throughout the composite material.

In an example embodiment including at least one of the features of the method of any of the previous paragraphs, mixing the wear resistance particles into the composite material includes adding an amount of the wear resistance particles to establish between 0.1 wt % and 20 wt % wear resistance particles.

In an example embodiment including at least one of the features of the method of any of the previous paragraphs, the wear resistance particles have a hardness of at least 5 on the Moh's hardness scale.

In an example embodiment including at least one of the features of the method of any of the previous paragraphs, the wear resistance particles comprise silicon carbide (SiC), Silicon Nitride ($Si_3N_4$) or diamond and the composite material comprises thermoplastic polyurethane.

In an example embodiment including at least one of the features of the method of any of the previous paragraphs, forming the sheave liner body includes leaving at least some of the wear resistance particles exposed on an outer surface of the formed sheave liner body and the exposed wear resistance particles establish a traction characteristic of the sheave liner.

The various features and advantages of at least one disclosed example embodiment will become apparent to those skilled in the art from the following detailed description. The drawings that accompany the detailed description can be briefly described as follows.

DETAILED DESCRIPTION

Figure 1:
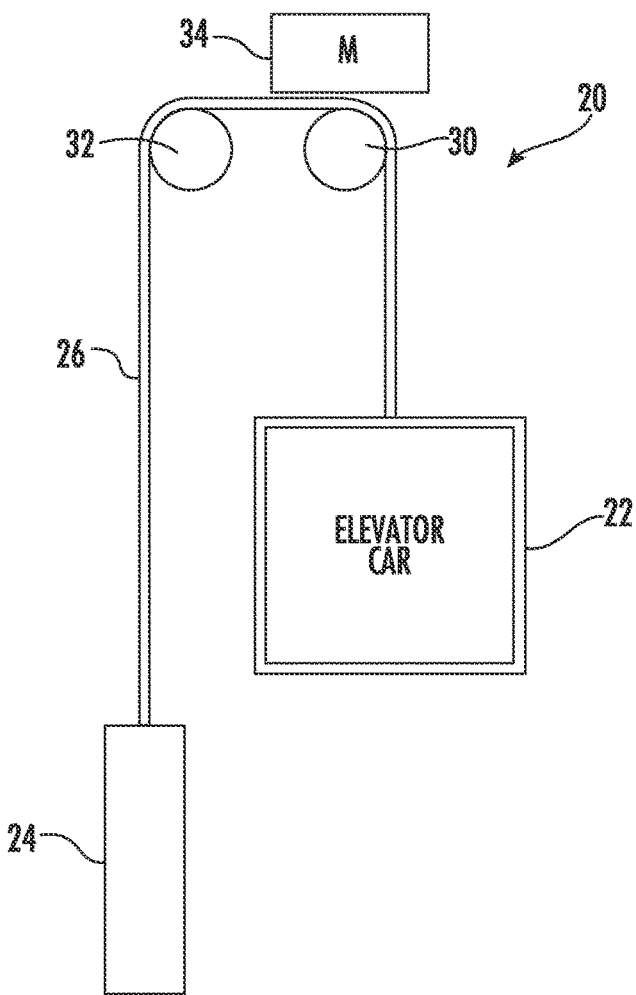
FIG. 1 schematically illustrates selected portions of an example elevator system.

FIG. 1 shows selected portions of an elevator system 20. An elevator car 22 and counterweight 24 are suspended by a roping arrangement of tension members 26. In the disclosed example embodiment, the tension members 26 include a plurality of round ropes.

A traction sheave 30 and an idler sheave 32 establish a path along which the tension members 26 travel for purposes of moving the elevator car 22 as desired. An elevator machine 34 causes the necessary movement of the traction sheave 30 to achieve the desired elevator car movement. In some example embodiments, the traction sheave 30 could be a surface of the machine shaft rather than a separate component.

Figure 2:
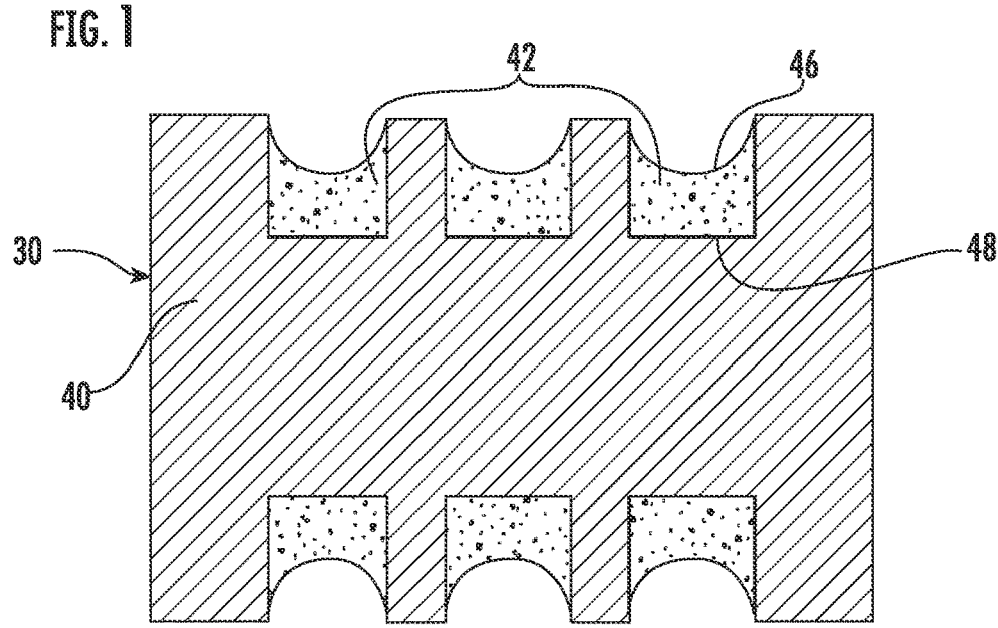
FIG. 2 is a cross-sectional illustration of an example elevator sheave including sheave liners according to a disclosed example embodiment.

FIG. 2 shows one example traction sheave 30 including a metallic body 40. One example comprises low carbon steel as the material used for forming the metal body 40 of the traction sheave 30. Sheave liners 42 are situated in grooves of the sheave 30 where the tension members 26 engage the traction sheave 30. The sheave liners 42 have a sheave liner body with an inner surface 48 that is received against the sheave 30 and an outer surface 46 that engages a tension member.

Figure 3:
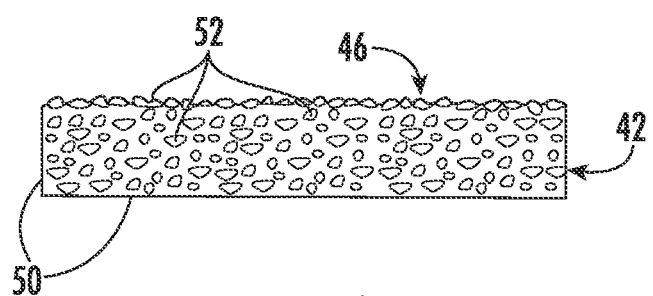
FIG. 3 is a partial cross-sectional diagram showing the sheave liner material composition of a disclosed example embodiment.

The sheave liners 42 comprise a material that provides a desired level of traction for engagement with the tension members 26 and resists wear of the sheave liner 42. A portion of the material of the sheave liners 42 is shown in FIG. 3. In the example embodiment, the material includes a composite material 50 and wear resistance particles 52 in the composite material 50. In this example, the wear resistance particles 52 are embedded and evenly distributed in the composite material 50 throughout the sheave liner body.

The wear resistance particles 52 include some that are situated along the outer surface 48. In some embodiments the wear resistance particles 52 along the outer surface 48 are at least partially exposed instead of being coated or covered with the composite material 50. The wear resistance particles 52 along the outer surface 46 establish a traction characteristic of the sheave liner 42. The wear resistance particles 52 introduce a surface structure, texture or roughness along the outer surface 46 that differs from an entirely flat or smooth surface that would be typical of a molded sheave liner. Even if a sheave liner made of composite material without wear resistance particles were made with a surface texture or roughness, that surface would become worn and smoother over time during operation of the elevator system.

Including the wear resistance particles 52 throughout the sheave liner body provides the traction characteristic established by the wear resistance particles 52 even if the sheave liner 42 wears over time and the thickness between the inner surface 48 and the outer surface 46 decreases. The wear resistance particles 52 provide the desired traction characteristic of the outer surface 46 throughout the expected useful life of the sheave liner 42.

The material properties of any partially exposed wear resistance particles 52 also contribute to the traction characteristic. The coefficient of friction between the tension member 26 and the composite material 50 is different than the coefficient of friction between the tension member 26 and the wear resistance particles 52. Including wear resistance particles 52 along the outer surface 46 provides a desired coefficient of friction between the outer surface 46 and the tension member 26 to establish a desired amount of traction.

The hardness of the wear resistance particles 52 contributes to the wear resistance of the sheave liner 42. In some embodiments, the metallic particles have a hardness of at least 5 on the Moh's hardness scale. Some embodiments include Silicon Carbide (SiC) wear resistance particles 52. Other embodiments include Silicon Nitride ($Si_3N_4$) or diamond wear resistance particles 52.

The wear resistance particles of the example embodiment are nanoparticles or microparticles. In some embodiments, at least some of the wear resistance particles 52 are microparticles that have a size in a range from about 1 micron to about 10 microns. In other embodiments, at least some of the wear resistance particles 52 are nanoparticles that have a size in a range from about 10 nm to about 1000 nm. The size of each particle corresponds to a cross-sectional dimension such as a width or diameter of the particle.

The composite material 50 in the illustrated example embodiment is a thermoplastic polyurethane composite. Including the wear resistance particles 52 provides longer life as the wear resistance particles 52 tend to resist wear better than a thermoplastic polyurethane composite could on its own. At the same time, the disclosed sheave liners 42 provide the advantages of a thermoplastic sheave liner, such as easy installation.

Figure 4:
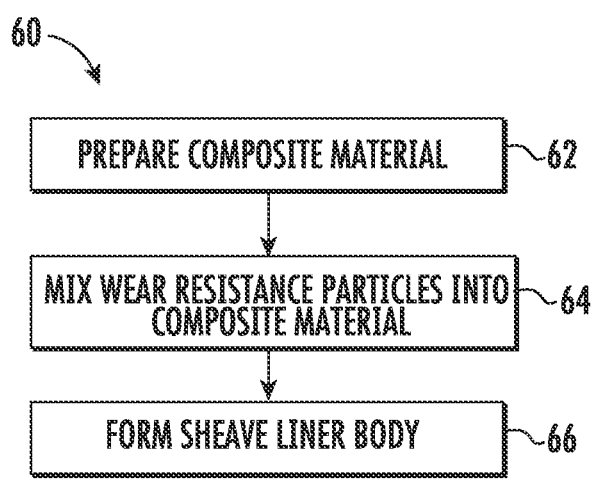
FIG. 4 is a flow chart diagram summarizing an example technique to make a sheave liner designed according to an embodiment consistent with this description.

FIG. 4 is a flowchart diagram 60 that summarizes an example approach to make a sheave liner 42. At 62, a composite material, such as polyurethane-based, is prepared. At 64, the wear resistance particles 52 are mixed into the composite material. The mixing in this example embodiment includes uniformly distributing the wear resistance particles 52 throughout the composite material. The sheave liner body is formed at 66.

The amount of wear resistance particles 52 may be varied to achieve different traction characteristics or wear characteristics. The example embodiment includes selecting a combination of the wear resistance material, the size of the particles 52 and the amount of particles. Using different amounts of different materials or particle sizes may provide the same traction characteristic. The material of the sheave liner body in this example includes between one-tenth of one percent by weight (0.1 wt %) and twenty percent by weight (20 wt %) wear resistance particles 52. Those skilled in the art who have the benefit of this description will be able to determine what amount is useful for their particular implementation.

Sheave liners consistent with this description include wear resistance particles 52 in a composite material 50. The wear resistance particles 52 enhance the wear resistance and a traction characteristic of the sheave liner compared to one that is made of a composite material without wear resistance particles. A traction surface of the sheave liner 42 has a surface structure, texture or roughness that establishes a desired traction characteristic throughout the expected useful life of the sheave liner 42.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator sheave liner, comprising a liner body including an inner surface configured to be received against a sheave and an outer surface configured to engage an elevator tension member, the liner body comprising a composite material and a plurality of wear resistance particles in the composite material, the wear resistance particles are nanoparticles or microparticles, at least some of the wear resistance particles establishing a traction characteristic of the outer surface.

2. The elevator sheave liner of claim 1, wherein
at least some of the wear resistance particles are microparticles and
the size of the microparticles is between about 1 μm and about 20 μm.

3. The elevator sheave liner of claim 1, wherein
at least some of the wear resistance particles are nanoparticles and
the size of the nanoparticles is between about 10 nm and about 1000 nm.

4. The elevator sheave liner of claim 1, wherein the wear resistance particles are uniformly dispersed throughout the composite material of the liner body.

5. The elevator sheave liner of claim 1, wherein the liner body comprises between 0.1% and 20% by weight wear resistance particles.

6. The elevator sheave liner of claim 1, wherein the wear resistance particles have a hardness of at least 5 on the Moh's hardness scale.

7. The elevator sheave liner of claim 6, wherein the wear resistance particles comprise silicon carbide (SiC), Silicon Nitride ($Si_3N_4$) or diamond.

8. The elevator sheave liner of claim 1, wherein the at least some of the wear resistance particles that establish the traction characteristic are exposed on the outer surface.

9. The elevator sheave liner of claim 1, wherein the composite comprises thermoplastic polyurethane.

10. An elevator sheave comprising a sheave body and the elevator sheave liner of claim 1.

11. A method of making an elevator sheave liner, the method comprising:
preparing a composite material;
mixing a plurality of wear resistance particles into the composite material, wherein the wear resistance particles are nanoparticles or microparticles; and
forming a sheave liner body of the mixed composite material and wear resistance particles.

12. The method of claim 11, wherein the wear resistance particles have a hardness at least 5 on the Moh's hardness scale.

13. The method of claim 11, wherein the particles comprise silicon carbide (SiC), Silicon Nitride ($Si_3N_4$) or diamond.

14. The method of claim 11, wherein at least some of the wear resistance particles are microparticles having a size in a range from about 1 μm to about 20 μm.

15. The method of claim 11, wherein at least some of the wear resistance particles are nanoparticles having a size in a range from about 1 nm to about 1000 nm.

16. The method of claim 11, wherein mixing the wear resistance particles into the composite material includes uniformly dispersing the wear resistance particles throughout the composite material.

17. The method of claim 11, wherein mixing the wear resistance particles into the composite material includes adding an amount of the wear resistance particles to establish between 0.1 wt % and 20 wt % wear resistance particles.

18. The method of claim 11, wherein the wear resistance particles have a hardness of at least 5 on the Moh's hardness scale.

19. The method of claim 18, wherein
the wear resistance particles comprise silicon carbide (SiC), Silicon Nitride ($Si_3N_4$) or diamond; and
the composite material comprises thermoplastic polyurethane.

20. The method of claim 11, wherein
forming the sheave liner body includes leaving at least some of the wear resistance particles exposed on an outer surface of the formed sheave liner body; and
the exposed wear resistance particles establish a traction characteristic of the sheave liner.

* * * * *